United States Patent
Gillotin et al.

(10) Patent No.: US 12,370,385 B2
(45) Date of Patent: Jul. 29, 2025

(54) SYSTEM FOR DELIVERING BREATHING GAS TO PASSENGERS

(71) Applicant: SAFRAN AEROTECHNICS, Plaisir (FR)

(72) Inventors: Vincent Jean Pierre Marie Gillotin, Vauhallan (FR); Jean-Baptiste Philippe Delprat, Saclay (FR); Vincent Gérard Greter, Elancourt (FR); Stuart David Dixon Walker, Paris (FR)

(73) Assignee: SAFRAN AEROTECHNICS, Plaisir (FR)

( * ) Notice: Subject to any disclaimer, the term of this patent is extended or adjusted under 35 U.S.C. 154(b) by 801 days.

(21) Appl. No.: 17/642,182

(22) PCT Filed: Sep. 11, 2020

(86) PCT No.: PCT/EP2020/075508
§ 371 (c)(1),
(2) Date: Mar. 10, 2022

(87) PCT Pub. No.: WO2021/048379
PCT Pub. Date: Mar. 18, 2021

(65) Prior Publication Data
US 2022/0314039 A1 Oct. 6, 2022

(30) Foreign Application Priority Data
Sep. 13, 2019 (EP) .................................... 19306109

(51) Int. Cl.
*A62B 7/14* (2006.01)
*A62B 9/02* (2006.01)

(52) U.S. Cl.
CPC . *A62B 7/14* (2013.01); *A62B 9/02* (2013.01)

(58) Field of Classification Search
CPC ......... A61B 7/14; A62B 9/02; B64D 11/0632; B64D 2231/025
See application file for complete search history.

(56) References Cited

U.S. PATENT DOCUMENTS

| | | |
|---|---|---|
| 3,073,301 A | 1/1963 | Hay et al. |
| 4,098,271 A | 7/1978 | Maddock |

(Continued)

FOREIGN PATENT DOCUMENTS

GB 2237207 A 5/1991

OTHER PUBLICATIONS

English Translation of the International Search Report mailed on Nov. 12, 2020, issued in corresponding International Application No. PCT/EP2020/075508, filed on Sep. 11, 2020, 3 pages.

(Continued)

*Primary Examiner* — Kendra D Carter
*Assistant Examiner* — Maap Ellabib
(74) *Attorney, Agent, or Firm* — Christensen O'Connor Johnson Kindness PLLC

(57) ABSTRACT

A system for delivering breathing gas to passengers includes:
a face mask including a face part having a breathing cavity,
a tube configured to be supplied by pressurized breathing gas, and
a reservoir bag disposed between the tube and the face part. A passage connects the reservoir bag to the breathing cavity so that the system is configured to supply the breathing cavity through the reservoir bag. The reservoir bag includes a front portion and a back portion. The front portion is connected to the face mask, and the system has a stowed configuration and a (Continued)

deployed configuration. In the stowed configuration, the reservoir bag is maintained folded between a backing and the face part.

12 Claims, 6 Drawing Sheets

(56) References Cited

U.S. PATENT DOCUMENTS

| | | | |
|---|---|---|---|
| 4,718,572 A | 1/1988 | Gosse et al. | |
| 7,784,463 B2 | 8/2010 | Cannon | |
| 8,474,456 B2 * | 7/2013 | Rittner | A62B 7/14 128/204.26 |
| 2005/0116101 A1 | 6/2005 | Pozzi et al. | |
| 2005/0150495 A1 * | 7/2005 | Rittner | A62B 18/025 128/205.13 |
| 2012/0222676 A1 * | 9/2012 | Cannon | A62B 7/14 128/205.13 |

OTHER PUBLICATIONS

English Translation of the Written Opinion of the International Searching Authority mailed on Nov. 12, 2020, issued in corresponding International Application No. PCT/EP2020/075508, filed on Sep. 11, 2020, 4 pages.

* cited by examiner

SYSTEM FOR DELIVERING BREATHING GAS TO PASSENGERS

CROSS-REFERENCES TO RELATED APPLICATIONS

This application is a National Stage of International Application No. PCT/EP2020/075508, filed Sep. 11, 2020, which claims priority to European Patent Application No. 19306109.0, filed Sep. 13, 2019, the entire disclosures of which are hereby incorporated by reference.

FIELD OF THE DISCLOSURE

Embodiments of the disclosure relate to systems for delivering oxygen or other breathing gas to passengers on-board an aircraft and more particularly, although not necessarily exclusively, to techniques for storing and deploying reservoir bags of the systems.

BACKGROUND

During cruise portions of flight, most commercial passenger aircraft operate at altitudes exceeding fourteen thousand feet. At these altitudes, insufficient oxygen may be present in the ambient air to sustain human consciousness or life. Accordingly, cabins of the aircraft are pressurized, often to altitudes equating approximately eight thousand feet. At such "cabin altitudes," sufficient oxygen normally will be present in ambient air to avoid hypoxia and thereby sustain human consciousness and life.

Loss of cabin pressurization when an aircraft is flying above, e.g., fourteen thousand feet, therefore, creates risk of passengers (and crew) experiencing hypoxia.

Aircraft hence typically are fitted with emergency oxygen systems configured to supply supplemental oxygen to passengers temporarily while an aircraft operator reduces the flight altitude of the aircraft. The systems include cup-shaped face masks connected to sources of oxygen via flexible tubing. Also frequently attached to the each face mask is an inflatable reservoir bag made of lightweight, flexible plastic, which may accumulate gas for subsequent breathing by the passenger having donned the mask.

U.S. Pat. No. 7,784,463 to Cannon describes such an emergency oxygen system for use on-board aircraft. Illustrated in FIG. 1 of the Cannon patent is a passenger wearing a face mask, from whose back an elongated reservoir bag protrudes. Prior to deployment, the face mask, reservoir bag, and associated tubing typically are stored in drop-out boxes (DOBs) within commercial aircraft. Stowing these components in DOBs may be difficult, however, with the reservoir bags often needing to be folded in order to fit neatly within the space allotted inside the DOBs. Consequently, when deployed, the bags must be unfolded quickly in order to function correctly once a passenger dons the associated mask.

SUMMARY

The present disclosure seeks to provide systems in which reservoir bags may be stored more easily within drop out boxes (DOBs) and corresponding masks may be donned more easily by passengers. The systems additionally may provide compact structures reducing the volume of storage space needed within the drop out boxes. Reduced damage to the reservoir bags prior to and during deployment also may result from practice of the present disclosure.

It is another optional, non-exclusive object of the present disclosure to provide oxygen-delivery systems in which reservoir bags are confined, in whole or in principal part, prior to deployment.

It is a further optional, non-exclusive object of the present disclosure to provide oxygen-delivery systems in which movable backings may be utilized to effect confinement of the reservoir bags prior to deployment.

It is, moreover, an optional, non-exclusive object of the present disclosure to provide oxygen-delivery systems in which pressurization of a reservoir bag causes movement of a backing.

In at least some embodiments of the present disclosure, the system for delivering breathing gas to passengers on-board an aircraft, the system comprising:
  a face mask, the face mask comprising a face part having a breathing cavity,
  a tube configured to be supplied by pressurized breathing gas, and
  a reservoir bag, the reservoir bag is disposed between the tube and the face part, a passage connecting the reservoir bag to the breathing cavity so that the system is configured to supply the breathing cavity through the reservoir bag, the reservoir bag comprises a front portion and a back portion, the front portion is connected to the face mask, the system has a stowed configuration and a deployed configuration, in the stowed configuration the reservoir bag is maintained folded between a backing and the face part.

Thus, the present disclosure provides oxygen-delivery systems having improved storage for reservoir bags. As the reservoir bag is maintained with respect to the face part and is folded, the volume of storage space needed within the drop out boxes is reduced and the risk of damage to the reservoir bag is reduced.

Certain versions of the present disclosure contemplate using partial inflation of the reservoir bag to cause movement of the backing. Stated differently, as pressurized gas flows into the reservoir bag, the bag may expand until it forces movement of the backing. If the gas pressure required to move the backing is greater than that usually needed for the passenger's respiratory purposes, techniques may be employed to increase the pressure to the required level temporarily and then return to the lower level for breathing purposes.

According to an optional feature in accordance with the disclosure, preferably the system comprises an inlet (check) valve movable between an open position and a closed position, the inlet valve closing the passage in the closed position, and the system is configured to maintain the inlet valve in the closed position while the pressure in the reservoir bag is not increased at least 5 mbar, preferably at least 10 mbar, higher than an ambient pressure.

Thus, the pressurized breathing gas causes the reservoir bag to first inflates in order to move into a satisfying deployed configuration in which the whole reservoir bag or substantially the whole reservoir bag may store breathing gas before a user's inhalation.

According to a supplementary optional feature in accordance with the disclosure, preferably the system is configured to move the inlet valve to the open position when the pressure in the breathing cavity is decreased of 3 mbar or more, preferably 2 mbar or more, below the ambient pressure.

Thus, inhaling the breathing gas stored in the reservoir bag does not require a substantial effort to the user.

According to another optional feature in accordance with the disclosure, preferably the back portion comprises a protrusion and, in the stowed configuration, the protrusion is releasably retained by the face part to maintain the reservoir bag folded between the back portion and the face part.

Thus, the reservoir bag can be efficiently maintained folded between the backing and the face part.

According to a supplementary optional feature in accordance with the disclosure, preferably the system is configured to release the protrusion when the back portion is moved away from the face part.

Thus, deploying the reservoir bag places the system in condition for use.

According to a supplementary optional feature in accordance with the disclosure, preferably the protrusion is a bung, in the stowed configuration the protrusion closes the passage.

Thus, the protrusion causes both the reservoir bag to be maintained folded in the stowed configuration and then to first inflate (before supplying the breathing cavity with the breathing gas).

According to a supplementary optional feature in accordance with the disclosure, preferably the system is configured to move the back portion away from the face part when the reservoir bag inflates, in order to release the protrusion when the reservoir bag is in the deployed configuration.

Thus, the pressurized breathing gas supplied through the tube causes the reservoir bag to inflate at least as long as the protrusion closes the passage. Then, the pressurized breathing gas causes the protrusion to be released in order to move the reservoir bag into a satisfying deployed configuration.

According to a supplementary optional feature in accordance with the disclosure, preferably the protrusion has a substantially Ω cross section shape, the protrusion comprising a neck portion and an enlarged head protruding from the back portion, the passage has a corresponding section (preferably comprising an enlarged portion and a neck) configured to cooperate with the protrusion, in order to releasably retain the enlarged head.

Thus, the protrusion may efficiently be retained by the passage and then released.

According to another supplementary optional feature in accordance with the disclosure, preferably the protrusion protrudes from a base portion and the protrusion is integral with the base portion.

Thus, the system is easier to manufacture.

According to another optional feature in accordance with the disclosure, preferably the reservoir bag comprises a bellow type portion and the back portion is substantially plate.

Thus, the volume of storage space is reduced for a determined maximum internal volume and the reservoir bag moves more easily from the stowed configuration to the deployed configuration.

According to another optional feature in accordance with the disclosure, preferably the back portion of the reservoir bag is resiliently deformable.

Thus, the reservoir bag moves more quickly and easily from the stowed configuration to the deployed configuration.

According to another supplementary optional feature in accordance with the disclosure, preferably the reservoir bag comprises a main portion having a first thickness and the back portion has a second thickness being at least three times as thick as the first thickness.

Thus, the back portion of the reservoir bag, resiliently deformable, may be manufactured easily.

Moreover, according to a supplementary feature in accordance with the disclosure, preferably the back portion of the reservoir bag comprises the backing.

Thus, the system is lighter and easier to manufacture and to implement.

According to an alternative optional feature in accordance with the disclosure, preferably the backing is separate from the back portion of the reservoir bag and the backing is stiffer than the back portion.

According to a supplementary optional feature in accordance with the disclosure, preferably the backing comprises a first portion and a second portion, in the stowed configuration the first portion is opposite the back portion of the reservoir bag and the second portion is substantially tubular and extends from the first portion to the face part, the second portion surrounding the reservoir bag and, in the stowed configuration the reservoir bag is confined between the backing and the face part.

Thus, the reservoir bag is stored in a folded condition in a confined area abutting the back of its associated face mask. The area may be bounded by both the back of the mask and a separate backing, either partially or completely enclosing the reservoir bag prior to deployment. Upon deployment of the mask, the backing would move in any suitable manner so as to expose the reservoir bag for inflation in use. Accordingly, before exposure the reservoir bag is unlikely to catch, tear, or otherwise be damaged through contact with other structures.

According to another optional feature in accordance with the disclosure, preferably the system further comprises a retention clip movable between a retention position and a release position and, in the retention position, the retention clip cooperates with the backing in order to maintain the backing with respect to the face part.

According to a supplementary optional feature in accordance with the disclosure, preferably in the stowed configuration, the backing is opposite the back portion of the reservoir bag and the retention clip surrounds the reservoir bag between the face part and the backing and, in the stowed configuration, the reservoir bag is confined between the backing, the retention clip and the face part.

Preferably, the retention clip is urged toward the retention position.

According to another supplementary optional feature in accordance with the disclosure, preferably:
the system further comprises a box, the box comprising a housing and a door, the housing having a back wall, lateral walls and an opening, the door is movable between a closed position in which the door closes the opening and an open position in which the door is away from the opening,
the system comprises a spring urging the back portion away from the face part (toward the deployed configuration), and
in the stowed configuration, the door is in the closed position, the face part and the reservoir bag are within the housing, the spring urges the face part toward the door and the face part abuts against the door, so that the reservoir bag is maintained folded between the back wall and the face part.

Thus, the spring causes both the reservoir bag to move into the deployed configuration and the face mask to be ejected out of the box with the reservoir bag upon opening of the door.

According to a supplementary optional feature in accordance with the disclosure, in the stowed configuration, the retention clip preferably cooperates with a retention portion of the back wall releasably maintaining the retention clip in the retention position.

Thus, the reservoir bag is confined when stored, so that the reservoir bag is unlikely to be damaged.

According to a supplementary optional feature in accordance with the disclosure, preferably the system is configured so that in the open position of the door, the spring urges the face part and the retention clip moves away from the retention portion of the back wall, the retention clip is released and the back portion of the reservoir bag is consequently released, so as to expose the previously-confined part of the reservoir bag for use by a passenger.

Other objects, features, and advantages of the present disclosure will be apparent to persons skilled in the art with reference to the remaining text and drawings of this application.

DESCRIPTION OF THE DRAWINGS

Other features and advantages of the present disclosure will appear in the following detailed description, with reference to the appended drawings in which.

DETAILED DESCRIPTION

Figure 1:
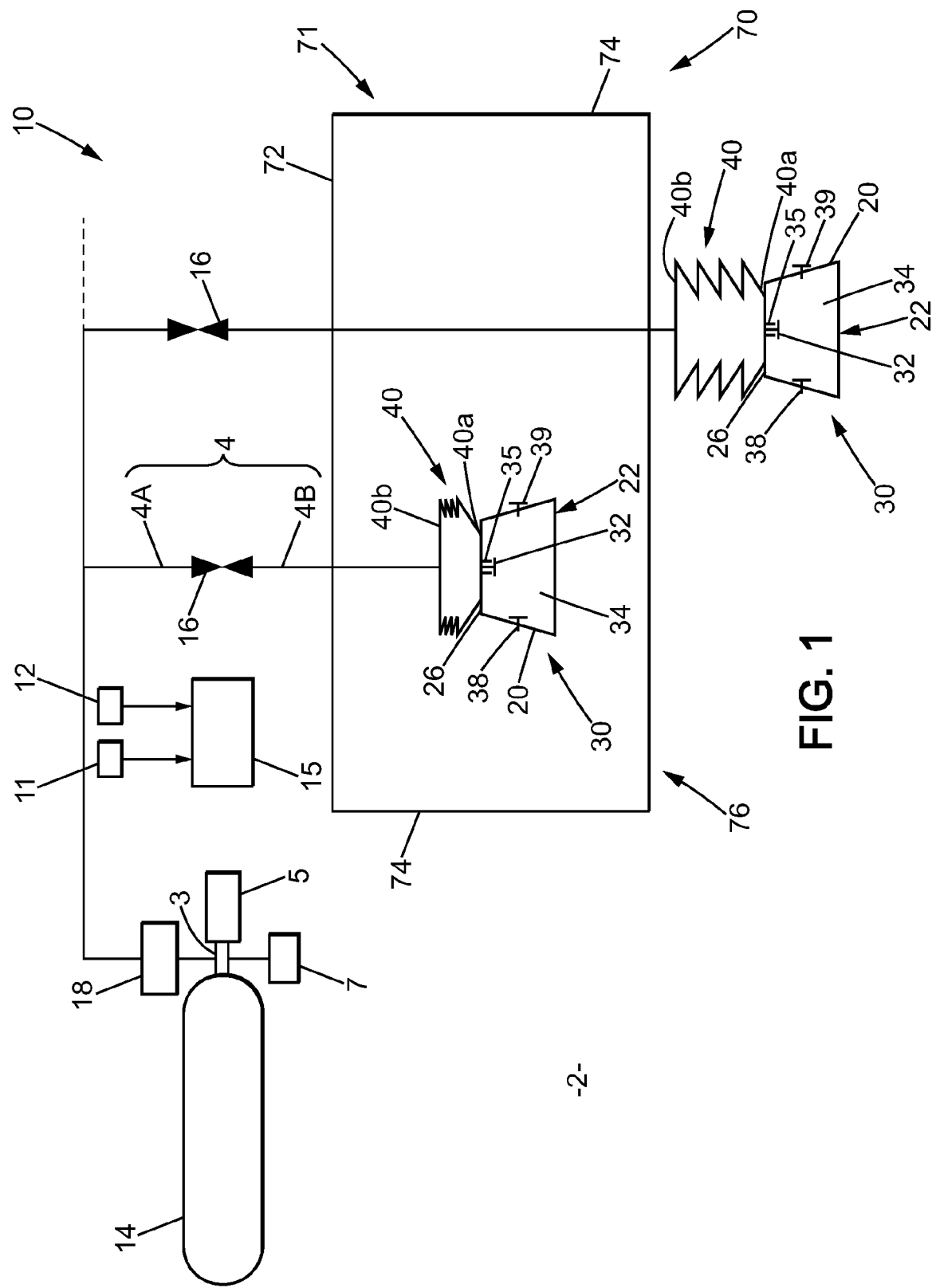
FIG. 1 is a schematized view of an oxygen-delivery system.

FIG. 1 depicts a system 10 for delivering complementary breathing gas (oxygen) to passengers on-board an aircraft. The system 10 is implemented in an aircraft, more accurately in the cabin of an aircraft. The cabin of the aircraft is pressurized so that cabin ambient air 2 is pressurized and includes a standard rate of oxygen (about 21%). The system 10 is intended to deliver complementary breathing gas (oxygen) to passengers on-board an aircraft in case of depressurisation due to the failure of pressurisation device or an uncontrolled leak between the cabin and outside, and/or when toxic gases, in particular fumes, are present in the cabin ambient air 2. Usually, the system 10 is placed above the head of the passengers and is configured to deliver complementary breathing gas (oxygen) to a row of passengers.

The system 10 illustrated in FIG. 1 comprises a box 70 (usually called drop out box), a source of respiratory (oxygen source 14), at least one valve 16, a plurality (two are illustrated) of face masks 30 for passengers (users), a group of reservoir bags 40, a controller 15 and tubing 4.

Tubing 4 includes first tube 4A and second tube 4B.

The delivery valves 16 are disposed between the oxygen source 14 and the reservoir bags 40. The delivery valves 16 are connected to the oxygen source 14 by first tube 4A, preferably rigid tube, which supplies the delivery valves 16 with breathing gas. In the embodiment shown, the oxygen source 14 is a reservoir of pressurized oxygen.

Each reservoir bag 40 is associated with one of the face masks 30. The reservoir bag 40 has an internal cavity 40c for storing breathing gas. The reservoir bag 40 comprises a front portion 40a and a back portion 40b. In the embodiment illustrated, each delivery valve 16 is associated with one of the face masks 30. The reservoir bag 40 is disposed between the delivery valve 16 and the face mask 30. The reservoir bag 40 is connected, at the back portion 40b, to the delivery valve 16 by the second tube 4B, preferably flexible tube. So, the reservoir bag 40 is disposed between the tube 4B and the face part 20 of the face mask 30. In a variant, the system 10 could include only one delivery valve.

Each face mask 30 comprises a face part 20 which has a breathing cavity 34 in which the user (passenger) is intended to inhale and exhale. In the embodiment illustrated, as is conventional, the face part 20 has a cup-shape internally defining the breathing cavity 34. The face part 20 comprises a back 26 and a front opening 22 designed to surround the nose and mouth of a passenger when the system 10 is deployed. The face mask 30 comprises at least one passage 35 and an inlet valve 32. The passage 35 is disposed in the back 26 and connects the breathing cavity 34 to the front portion 40a of the reservoir bag 40. The inlet valve 32 is intended to reduce the risk of ingression of water, ice or dust into the reservoir bag 40 while enabling the face mask 30 to be supplied with breathing gas when the pressure P34 in the breathing cavity 34 is lightly lower than the pressure P40 in the reservoir bag 40. The inlet valve 32 is disposed within the passage 35 or at an end of the passage 35. An elastic strap (also not shown) typically is attached to mask 30 for fitting about the passenger's head.

Each mask 30 further comprises an ambient valve 38 which enables each passenger to breath cabin ambient air 2 diluting the breathing gas (when the reservoir bag 40 is empty). Each face mask 30 also comprises an exhalation valve 39 to enable gas within the face mask 30 to exhaust the face mask 30 when the passenger exhales. The ambient valve 38, the exhalation valve 39 and the inlet valve 32 are preferably check valves.

The box 70 comprises a housing 71 and a door 78 (not shown in FIG. 1). The housing 71 has a back wall 72 and lateral walls 74 delimiting a stowage cavity 75. The stowage cavity 75 has an opening 76 opposed to the back wall 72. The door 78 is movable between a closed position in which the door 78 closes the opening 76 and an open position in which the door 78 is away from the opening 76.

The system 10 additionally may include manifold 3 in gaseous communication with the oxygen source 14. Manifold 3 may, if appropriate, have a relief valve 7 or other means of venting gas if the pressure thereof exceeds a particular threshold. Downstream of manifold 3 may be a high pressure (HP) reducer and/or a regulator 18, which functions to decrease or otherwise regulate the pressure of the oxygen from housing 3 before the oxygen flows to passengers of an aircraft or other vehicle. The HP reducer and/or the regulator 18 preferably reduces the absolute pressure between 1.5 bar and 6 bar.

Also, included as part of the system 10 may be an initiator 5. The oxygen source 14 is initially sealed. The initiator 5 may comprise any suitable mechanism for establishing gas flow from the source of breathing gas 14 to manifold 3.

The system 10 illustrated in FIG. 1 further comprises a cabin altitude sensor 11 and an aircraft altitude sensor 12 connected to the controller 15. The cabin altitude sensor 11 senses the pressure P2 of ambient gas 2 within the cabin (also referred to as cabin altitude). The aircraft altitude sensor 12 senses the pressure outside the cabin (outside the aircraft, also referred to as aircraft altitude).

In the system illustrated in FIG. 1, the controller 15 is configured to control the delivery valves 16 to provide a continuous flow of breathing gas to the reservoir bag 40 through second tube 4B, in order to supply aircraft passengers with breathing gas when the cabin altitude (corresponding to pressure P2 of ambient air in the cabin) is sufficiently high as to induce hypoxia. The continuous flow of breathing gas is preferably adjusted based on the information provided at least by the cabin altitude sensor 11.

At least part of the oxygen source 14, the first tube 4A, the controller and the delivery valves 16 are in the drop out box 70, preferably in a portion separate from the stowage cavity 75.

The system 10 has a stowed configuration and a deployed configuration. In the stowed configuration, the door 78 is in the closed position and the face masks 30 are in the stowage cavity 75. Moreover, in the stowed configuration, the reservoir bag 40 is maintained folded between a backing 50 (not shown in FIG. 1) and the back 26 of the face part 20. In the deployed configuration, the face masks 30 are outside the stowage cavity 75 and the reservoir bag 40 are released to enable storage of breathing gas in the internal cavity 40c of the reservoir bag 40. The internal cavity 40c of the reservoir bags 40 quite exclusively contains breathing gas. So, the volume of the internal cavity 40c varies, up to a determined maximum capacity of the reservoir bag 40.

Figure 2A:
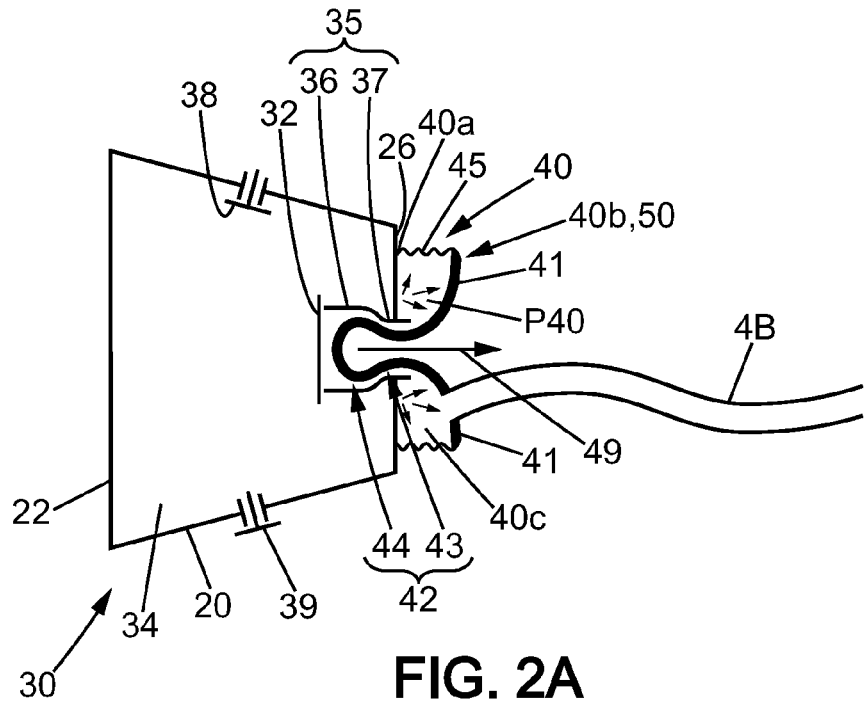
FIG. 2A illustrates a first embodiment of oxygen-delivery system, in a stowed configuration.
Figure 2B:
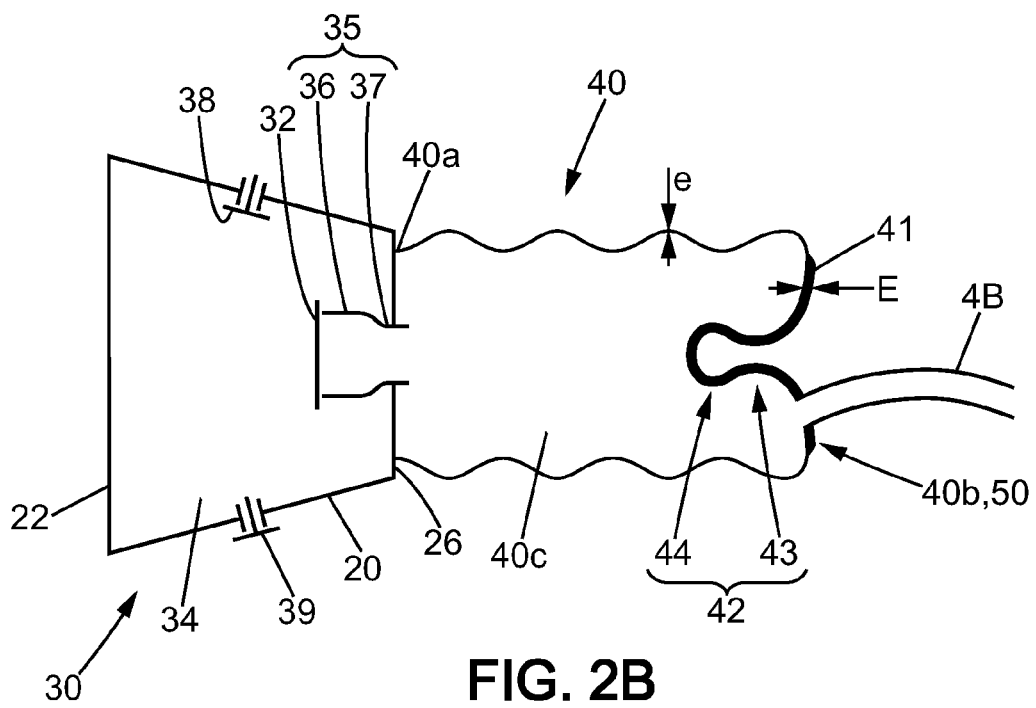
FIG. 2B illustrates the first embodiment of oxygen-delivery system, in a deployed configuration.

In the first embodiment shown in FIGS. 2A and 2B, the reservoir bag 40 comprises a bellow type portion 45 extending between the back portion 40b and the front portion 40a. The bellow type portion 45 comprises at least one couple of pleats, preferably at least three couples of pleats. In the first embodiment shown in FIGS. 2A and 2B, the bellow type portion 45 comprises four couples of pleats. The pleats may be rounded, so that they form corrugations, as shown in FIGS. 2A and 2B. The back portion 40b goes back and forth during inflation and deflation of the reservoir bag 40, the back portion 40b substantially translating toward the front portion 40a and away the front portion 40a along an inflation direction 49.

The back portion 40b comprises a base portion 41 and a protrusion 42. The base portion 41 is substantially plate and extends substantially perpendicular to the inflation direction 49. The protrusion 42 protrudes from the base portion 41 toward the face part 20, in particular toward the passage 35. The protrusion 42 is preferably integral, in particular in the same material as the base portion 41.

The bellow type portion 45 has a first thickness e and the back portion 40b has a second thickness E. The second thickness E is at least three times, preferably at least ten times, as thick as the first thickness e. More preferably, the first thickness is between 0.01 millimeter and 0.1 millimeter whereas the second thickness E is between 0.1 millimeter and 1 millimeter.

The back portion 40b is resiliently deformable. Preferably, the reservoir bag 40 is in elastomeric material, in particular polypropylene or silicone.

The protrusion 42 is preferably rotationally symmetrical. The protrusion 42 comprises a neck portion 43 and an enlarged head portion 44. The neck portion 43 connects the head portion 44 to the base portion 41, the neck portion 43 being disposed between the head portion 42 and the base portion 41. So, as shown in FIG. 2A and FIG. 2B the back portion 40b has a substantially Ω shape.

The passage 35 comprises an enlarged portion 36 and a neck portion 37. As shown in FIG. 2A, in the stowed configuration, the enlarged head portion 44 of the protrusion 42 is configured to be received in the enlarged portion 36 of the passage 35 and the neck 43 of the reservoir bag 40 is configured to be received in the neck portion 37 of the passage 35.

The maximum external diameter of the head portion 44 of the protrusion 42 is at least 10%, preferably at least 20% larger than the internal diameter of the neck portion 37 of the passage 35, so that the protrusion 42 is resiliently retained in the passage 35. The protrusion 42 is resiliently deformable whereas the passage 35 is preferably rigid, at least the passage 35 (at least the neck portion 37) is stiffer than the protrusion 42. Moreover, without external constraint (in particular when the protrusion is away from the passage 35), the neck portion 43 of the protrusion 42 has an external diameter higher than the internal diameter of the neck portion 37 of the passage 35, so that in the stowed configuration the passage 35 is closed by the protrusion 42.

Therefore, in the stowed configuration, the protrusion 42 forms a bung to create a seal between the breathing cavity 34 and the internal cavity 40c of the reservoir bag 40. The protrusion 42 also acts as retention mechanism as the enlarged head portion 44 of the protrusion 42 forms a bulbous part of the bung passing through the neck portion 37 of the passage 35 in the back 26.

And, as shown in FIG. 2A, in the stowed configuration, the back portion 40b of the reservoir bag 40 forms a backing 50, the reservoir bag 40 being maintained confined to an area immediately adjacent back 26 (between the backing 50 and the back 26 of the face part 20) until needed by a passenger.

Consistent with the depiction in FIG. 2A and FIG. 2B, as breathing gas flows through second tube 4B, pressure P40 within the internal cavity 40c of the reservoir bag 40 increases as sealed by the protrusion 42 within the passage 35. A sufficient pressure P40 within the internal cavity 40c of the reservoir bag 40 pushes the back portion 40b of the reservoir 40 along the inflation direction 49 allowing expansion of reservoir bag 40, which in turn pulls the protrusion 42 out of the passage 35. When the protrusion 42 is released from the passage 35, breathing gas can flow into the breathing cavity 34 of the face mask 30, through the inlet valve 32.

Figure 3A:
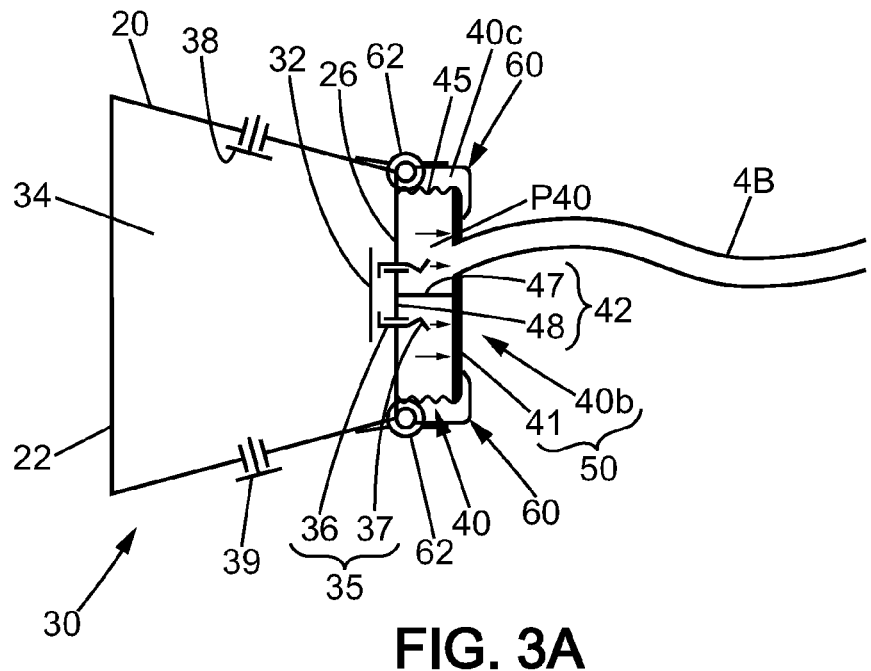
FIG. 3A illustrates a second embodiment of oxygen-delivery system, in the stowed configuration.
Figure 3B:
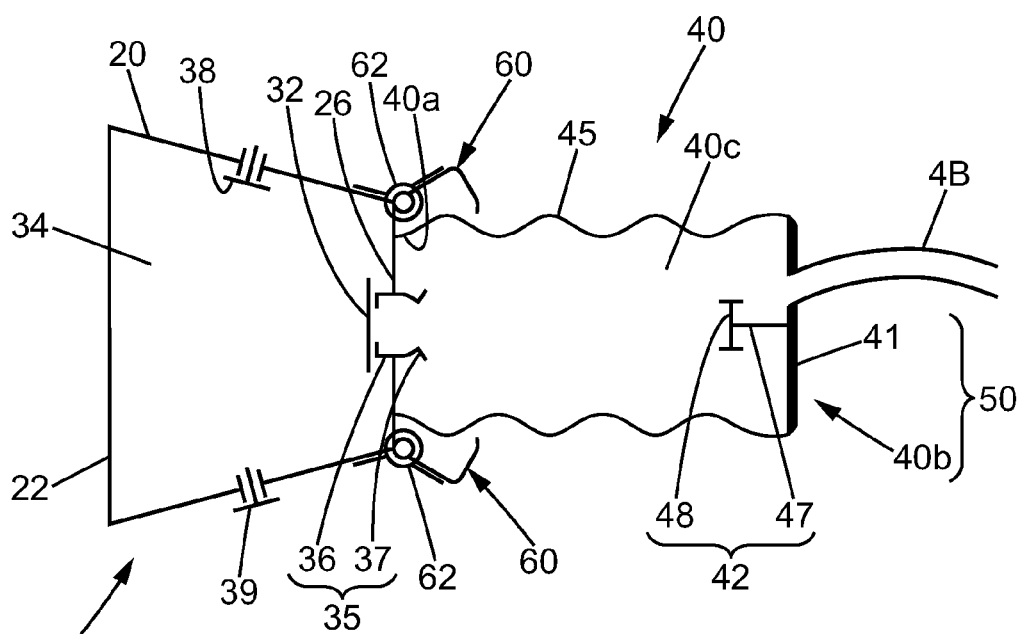
FIG. 3B illustrates the second embodiment of oxygen-delivery system, in the deployed configuration.

The second embodiment shown in FIG. 3A and FIG. 3B differs from the first embodiment by two separate main features.

First, the protrusion 42 comprises a rigid valve 48 having a spindle 47, the rigid valve 48 being distinct from the back portion 40b which comprises the plate base 41. The rigid valve 48 is fixed to the plate base 41 by the spindle 47.

Secondly, in the second embodiment, the system 10 comprises at least one retention clip 60. In the second embodiment shown in FIG. 3A and FIG. 3B, the system 10 comprises two retention clips 60. The retention clips 60 are articulated on the back 26 of the face part 20 between a retention position shown in FIG. 3A and a release position shown in FIG. 3B. The retention clips 60 are urged by springs 62, preferably torsion springs, toward the retention position. In the stowed configuration, the retention clips 60 are in the retention position, the retention clips 60 surrounds the reservoir bag 40 and cooperate with the backing 50, in order to maintain the backing 50 with respect to the face part 20. So, in the stowed configuration, the reservoir bag 40 is confined to an area immediately adjacent back 26 until needed by a passenger, between the backing 50, the retention clips 60 and the back 26 of the face part 20. The base plate 41 is preferably rigid and made of a material differing from the material of the bellow type portion 45. The base plate 41 is stiffer than the reservoir bag 40, in particular than the back portion 40b of the reservoir bag 40. In the embodiment shown in FIG. 3A and FIG. 3B, the back portion 40b of the reservoir 40 is molded over the base plate 41 or the like. So, the backing 50 comprises the base plate 41 and the back portion 40b. In a variant, the base plate 41 may be separate from the back portion 40b. So, the backing 50 would comprise only the base plate 41 and the base plate 41 would be opposite the back portion 40b of the reservoir bag 40, and in contact with the back portion 40b of the reservoir bag 40.

In the embodiment shown in FIG. 3A and FIG. 3B, the passage 35 comprises the enlarged portion 36 which is cylindrical and the neck portion 37 which is resiliently deformable to release the valve 48. The neck portion 37 releasably retains the valve 48 in the enlarged portion 36 in order to close the passage 35. Due to the retention clips 60 and the springs 62, the neck portion 37 may be omitted. In an alternative embodiment, the retention clips 60 and the springs 62 may be omitted.

As shown in FIG. 3A, in the stowed configuration, the back portion 40b of the reservoir bag 40, constituted by the plate base 41, forms a backing 50. The reservoir bag 40 is maintained folded between the backing 50 and the back 26 of the face part 20 by the neck portion 37 retaining the valve 48 and the retention clips 60 cooperating with the back portion 40b (only one of the cooperations being necessary, the other can be omitted).

Consistent with the depiction in FIG. 3A and FIG. 3B, as breathing gas flows through second tube 4B, pressure P40 within the internal cavity 40c of the reservoir bag 40 increases as sealed by the valve 48 forming a bung within the passage 35. A sufficient pressure P40 within the internal cavity 40c of the reservoir bag 40 pushes the back portion 40b of the reservoir 40 along the inflation direction 49 allowing expansion of reservoir bag 40, which in turn pulls the valve 48 out of the passage 35 and pushes the retention clips 60 toward the release position. When the protrusion valve 48 is released from the passage 35, breathing gas can flow into the breathing cavity 34 of the face mask 30, through the inlet valve 32.

Figure 4A:
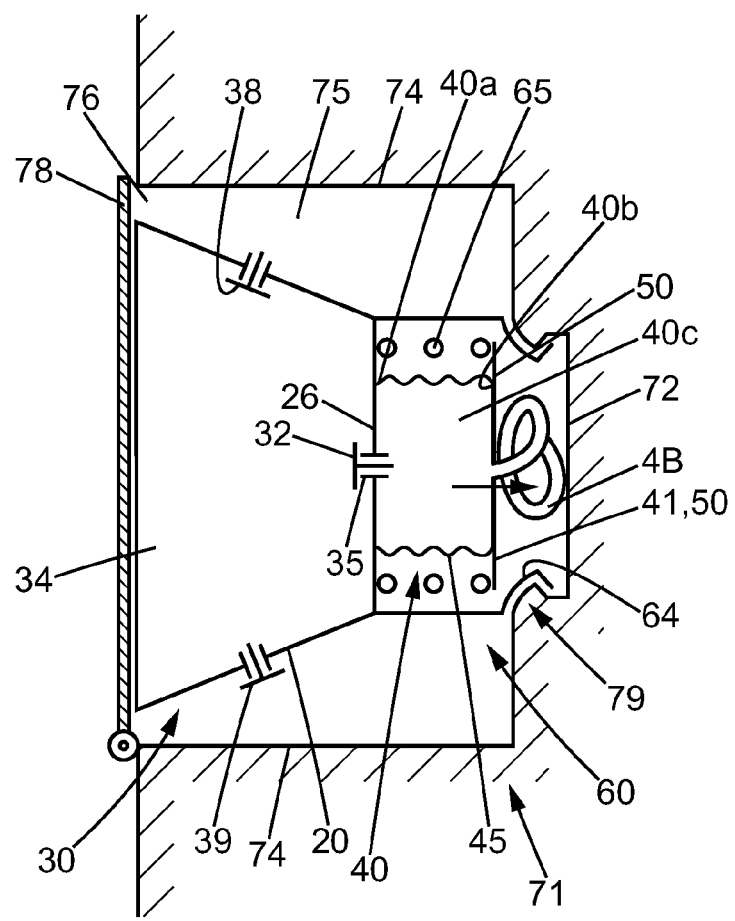
FIG. 4A illustrates a third embodiment of oxygen-delivery system, in the stowed configuration.
Figure 4B:
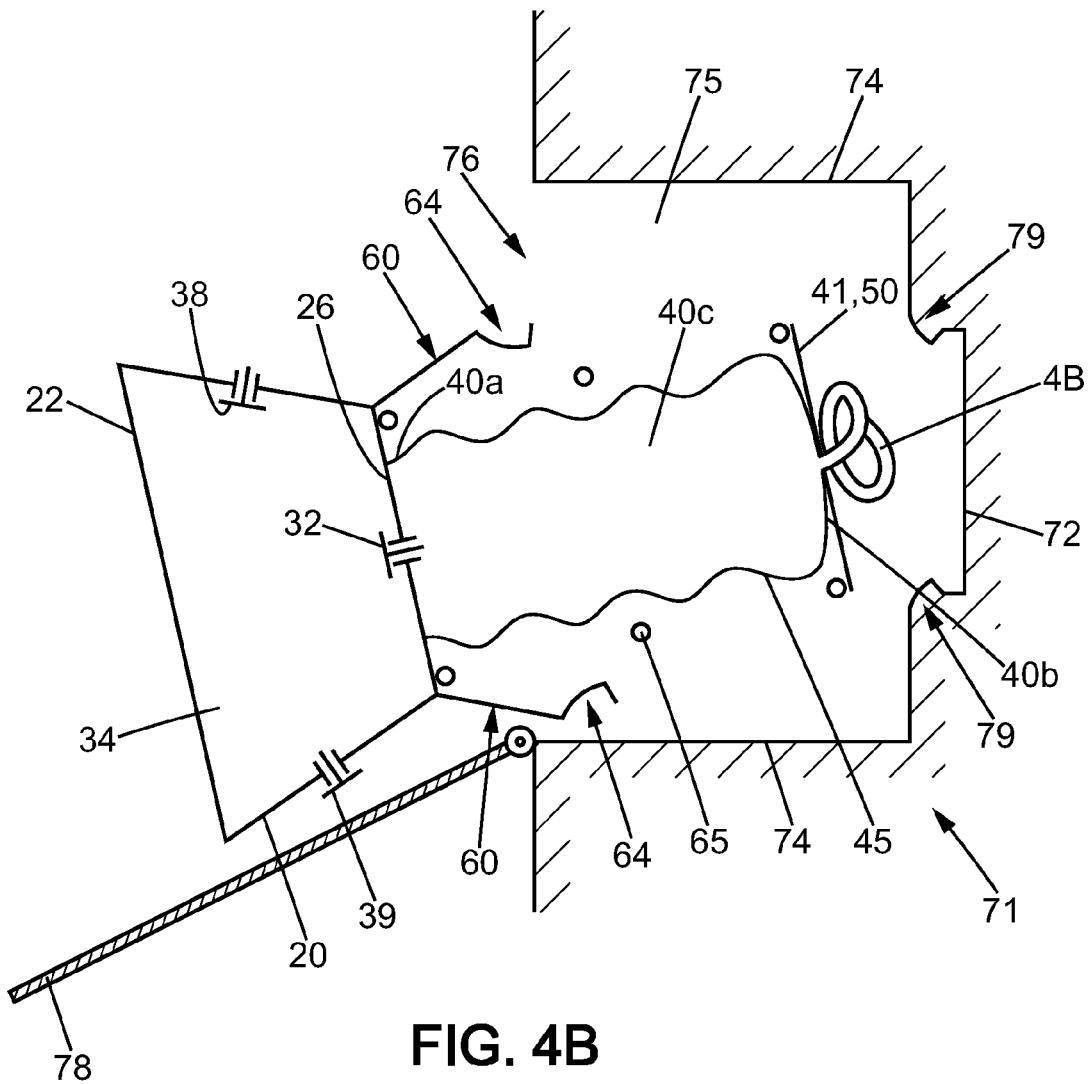
FIG. 4B illustrates a third embodiment of oxygen-delivery system, in the deployed configuration.

The third embodiment shown in FIG. 4A and FIG. 4B differs from the first embodiment and the second embodiment by three separate main features.

First, the retention clips 60 comprise, at a free end, a hook portion 64 configured to cooperate with a retention portion 79 of the back wall 72 in the stowed configuration, in order to releasably maintain the retention clips 60 in the retention position.

Secondly, the system comprises a spring 65 urging the back portion 40b of the reservoir bag 40 away from the back 26 of the face part 20.

Thirdly, the base plate 41 is rigid and distinct from the reservoir bag 40. The base plate 41 is stiffer than the reservoir bag 40, in particular than the back portion 40b of the reservoir bag 40.

As shown in FIG. 4A, in the stowed configuration, the door 78 is in the closed position, the face part 20 and the reservoir bag 40 are within the housing 71. The spring 65 urges the face part 20 toward the door 78, as the backing 50 abuts against the back wall 72 through the retention portion 79. The face part 20 abuts against the door 78. The reservoir bag 40 is maintained folded between the back wall 72 and the face part 20. The reservoir bag 40 is in particular confined between the backing 50, the retention clips 60 and the back 26 of the face part 20

As shown in FIG. 4B, when the door 78 is opening, the back 26 of the face part 20 moves away from the back wall 72 thanks to the spring 65. Consequently, the hook portion 64 of the retention clips 60 are released from the retention portions 79. So, the plate base 41 is moved away from the back 26 of the face part 20, the reservoir bag 40 is not confined anymore and the back portion 40b of the reservoir bag 20 is moved away from the front portion 40a. Moreover, the face part 20 is moved outside the housing 71 through the opening 76.

In the third embodiment, the reservoir bag 40 is deployed automatically without need for any pressure build-up caused by pressurized flow of breathing gas.

Figure 5A:
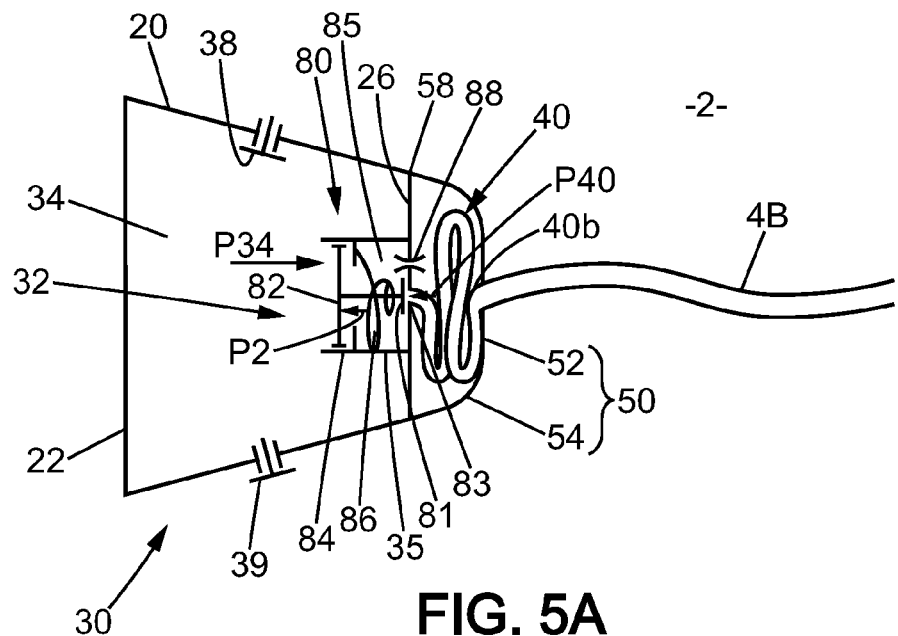
FIG. 5A illustrates a fourth embodiment of oxygen-delivery system, in the stowed configuration.
Figure 5B:
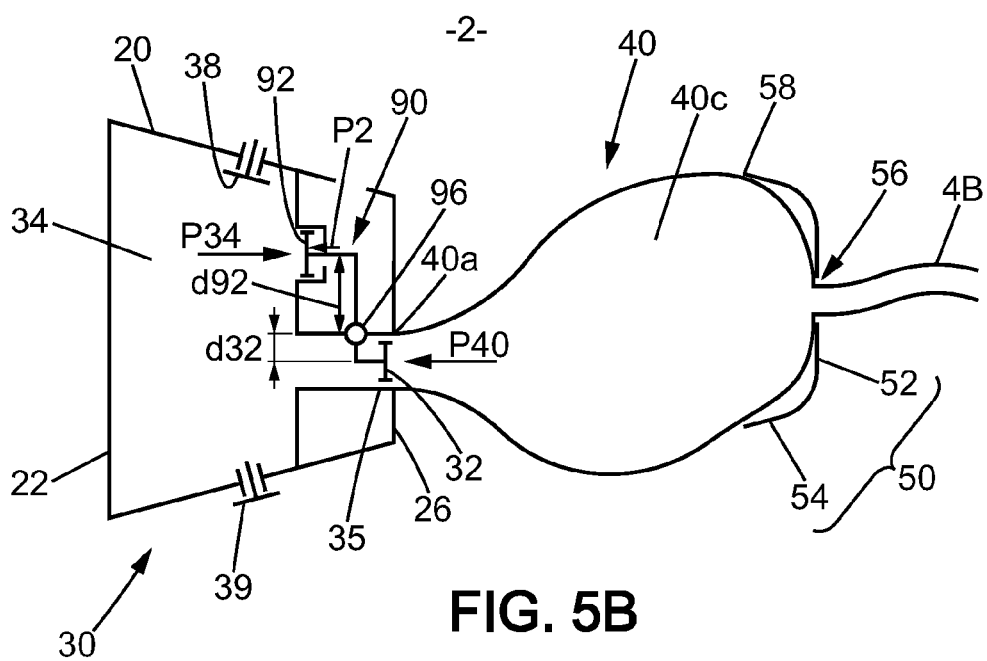
FIG. 5B illustrates a variant of the fourth embodiment of oxygen-delivery system, in the stowed configuration.

The fourth embodiment shown in FIG. 5A and FIG. 5B differs from the previous embodiments relating to two separate main features.

First, the backing 50 comprises a first portion 52 and a second portion 54. The backing 50 is rigid, stiffer than the reservoir bag 40, in particular than the back portion 40b of the reservoir bag 40. The backing 50 has a substantially cup shape or bowl shape. The first portion 52 is substantially flat and the second portion 54 is substantially tubular, slightly conical. The first portion preferably has an opening 56 to allow passage of the second tube 4B. In the stowed configuration, shown in FIG. 5A, the first portion 52 is opposite the back portion 40b of the reservoir bag 40 and the second portion 54 extends from the first portion 52 to the back 26 of the face part 20, surrounding the reservoir bag 40. The second portion 54 has a rim 58 preferably contacting the back 26 of the face part 20 in the stowed configuration. Therefore, the reservoir bag 40 is confined to an area immediately adjacent back 26 until needed by a passenger, between the backing 50 and the face part 20.

Preferably, the backing 50 is configured to remain attached to the face mask 30 prior to deployment of system 10 and to be movable relative to the mask 30 upon deployment so as to expose the reservoir bag 40. FIG. 5B conceptually depicts this exposure, showing the backing 50 remaining attached to the second tube 4B of the reservoir bag 40 after movement. In some versions of system 10, the backing 50 may have been separated from the face mask 30. In other versions, the backing 50 may remain attached to face mask 30 (having pivoted away from the face mask 30). In either circumstance, the reservoir bag 40 no longer is confined by the backing 50 and thus may inflate as needed to its full extent.

Secondly, according to the fourth embodiment the system 10 comprises a first device 80 (shown in FIG. 5A) or a second device 90 (shown in FIG. 5B) designed to require a higher overpressure (pressure difference between the pressure P40 in the reservoir bag 40 with respect to ambient pressure P2 of ambient air 2) in the internal cavity 40c of the reservoir bag 40 than the depressure in the breathing cavity 34 (pressure difference between the pressure P2 of ambient air 2 and the pressure P34 in the breathing cavity 34) to open the inlet valve 32.

The first device 80 comprises the inlet valve 32, a first orifice 83, a second orifice 84, an intermediate cavity 85, a spring 86 and a passage restraint 88. The inlet valve 32 comprises a first valve portion 81 and a second valve portion 82 rigidly fixed to the first valve portion 81. The first orifice 83 connects the internal cavity 40c of the reservoir bag 40 to the intermediate cavity 85. The second orifice 84 connects the intermediate cavity 85 to the breathing cavity 34. The inlet valve 32 is urged by the spring 86 in a closed position (shown in FIG. 5A) in which the first valve portion 81 closes the first orifice 83 and the second valve portion 82 closes the second orifice 84. Due to the passage restraint 88, the pressure in the intermediate cavity 85 is equal to the pressure P2 of the ambient air 2 when the inlet valve 32 is in the closed position.

As the area of the first valve portion 81 is lower, preferably at least ten times lower than the area of the second valve portion 82, an overpressure of 20 mbar between the pressure P40 (pressure in the internal cavity 40c of the reservoir bag 40) and the pressure P2 (pressure of ambient air 2) may be required to move the inlet valve 32 to the open position while a depressure of 2 mbar between the pressure P34 (pressure in the breathing cavity 34) and the pressure P2 is enough to move the inlet valve 32 to the open position.

The second device 90 comprises the inlet valve 32 and an inhalation valve 92. The inlet valve 32 is connected to the inhalation valve 92 by a lever 94 rotatably mounted on the face part 20 by a pivot 96. The inlet valve 92 is at a first distance d32 from the pivot 96 whereas the inhalation valve 92 is at a second distance d92 from the pivot 96. The second distance d92 is higher than the first distance d32. The area of the inlet valve 92 is preferably also higher than the area of the inhalation valve 92. So, an overpressure of at least 20 mbar between the pressure P40 (pressure in the internal cavity 40c of the reservoir bag 40) and the pressure P2 (pressure of ambient air 2) may be required to move the inlet valve 32 to the open position while a depressure of 2 mbar between the pressure P34 (pressure in the breathing cavity 34) and the pressure P2 may be enough to move the inlet valve 32 to the open position.

20 mbar overpressure enables the reservoir bag 40 to move from the stowed configuration shown in FIG. 5A, confined between the backing 50 and the back of the face part 20 to the deployed configuration shown in FIG. 5B.

A small pressure drop of 2 mbar in the breathing cavity 34 is enough to permit oxygen to flow from reservoir bag 40 which avoids huge efforts to the user to breath the breathing gas in the reservoir bag 40.

Otherwise, in the fourth embodiment, the reservoir bag 40 shown has not a bellow type portion, the reservoir bag consisting of two plastic sheets sealed one to the other by their edge. But, in variant, the reservoir bag 40 shown in the previous figures can be substituted for the reservoir bag 40 shown in FIG. 5A and FIG. 5B.

These examples are not intended to be mutually exclusive, exhaustive, or restrictive in any way, and the disclosure is not limited to these example embodiments but rather encompasses all possible modifications and variations within the scope of any claims ultimately drafted and issued in connection with the disclosure (and their equivalents). For avoidance of doubt, any combination of features not physically impossible or expressly identified as non-combinable herein may be within the scope of the disclosure.

The invention claimed is:

1. A system for delivering breathing gas to passengers, the system comprising:
    a face mask comprising a face part having a breathing cavity;
    a tube configured to be supplied by pressurized breathing gas; and
    a reservoir bag disposed between the tube and the face part, wherein a passage connects the reservoir bag to the breathing cavity so that the system is configured to supply the breathing cavity through the reservoir bag, wherein the reservoir bag comprises a front portion and a back portion, wherein the front portion is connected to the face mask,
    wherein the system has a stowed configuration and a deployed configuration, wherein in the stowed configuration, the reservoir bag is maintained folded between a backing and the face part,
    wherein the back portion comprises a protrusion, and wherein, in the stowed configuration, the protrusion is releasably retained by the face part to maintain the reservoir bag folded between the back portion and the face part.

2. The system according to claim 1, wherein:
    the system comprises an inlet valve movable between an open position and a closed position, the inlet valve closing the passage in the closed position, and
    wherein the system is configured to maintain the inlet valve in the closed position while a pressure in the reservoir bag is not increased by at least 5 mbar above an ambient pressure.

3. The system according to claim 2, wherein the system is configured to move the inlet valve to the open position when the pressure in the breathing cavity is decreased by 3 mbar or more below the ambient pressure.

4. The system according to claim 1, wherein the system is configured to release the protrusion when the back portion is moved away from the face part.

5. The system according to claim 1, wherein the protrusion is a bung, and in the stowed configuration the protrusion closes the passage.

6. The system according to claim 5, wherein the system is configured to move the back portion away from the face part when the reservoir bag inflates.

7. The system according to claim 1, wherein the protrusion has a substantially Ω cross section shape, the protrusion comprising a neck portion and an enlarged head protruding from the back portion, wherein the passage has a corresponding portion configured to cooperate with the protrusion, in order to releasably retain the enlarged head.

8. The system according to claim 7, wherein the protrusion protrudes from a base portion and the protrusion is integral with the base portion.

9. The system according to claim 1, wherein the reservoir bag comprises a bellow type portion and the back portion is substantially a plate.

10. The system according to claim 1, wherein the back portion of the reservoir bag is resiliently deformable.

11. The system according to claim 10, wherein the reservoir bag comprises a main portion having a first thickness and the back portion has a second thickness being at least three times as thick as the first thickness.

12. The system according to claim 10, wherein the back portion of the reservoir bag comprises the backing.

* * * * *